United States Patent Office 2,961,424
Patented Nov. 22, 1960

---

2,961,424

RESINOUS COMPOSITIONS COMPRISING ALPHA, BETA-ALKYLENE OXIDE ADDUCT OF A POLYOL AND RESINOUS AMINOPLAST AND PROCESS OF MAKING SAME

Albert C. Mueller, Berkeley, and Theodore F. Bradley, Orinda, Calif., assignors to Shell Oil Company, New York, N.Y., a corporation of Delaware No Drawing. Filed Apr. 29, 1958, Ser. No. 731,610

19 Claims. (Cl. 260—45.2)

This invention relates to improved surface coating compositions. More particularly, it relates to baked-enamel type of coatings derived from certain polyols and aminoplasts.

There has been described in the patents and literature numerous compositions which are useful as surface coatings as in paints, lacquers, varnishes, enamels and the like. Such compositions are formulated or prepared depending on the particular surface to be coated and its ultimate use. Depending on the surface and its use, the formulation of a particular coating composition is designed to give the most desirable properties which can be achieved. There are, however, numerous difficulties attendant in the preparation of surface coatings which leaves much to be desired. While it is a simple matter to list the properties that a particular surface coating should have, it has not yet been possible to produce such coatings which are ideal in all respects. At best, present day coatings are formulated to impart as many desirable properties and yet minimize the less satisfactory properties. The present invention affords novel surface coatings, particularly of the baked enamel type, which have improved properties over prior finishes of the same type.

It is an object of this invention to provide novel resinous compositions which are useful in the surface coating art. It is another object of this invention to provide such compositions which are useful for baked enamel finishes which have improved properties, as for example, improved solvent resistance. It is yet another object of this invention to provide improved surface coating compositions which have the advantages of improved properties, low cost and ease of preparation. Other objects will become apparent as the description of the invention proceeds.

These and other objects are accomplished with a resinous composition comprising the reaction product of (1) an alpha, beta-alkylene/oxide adduct of a polyol, the polyol consisting of a copolymer of an unsaturated monohydric alcohol and an alkenyl substituted aromatic compound and (2) a resinous aminoplast. The compositions of this invention, which may be referred to as "alkyd-amines," are cured usually with acidic-type catalysts to form hard, flexible coatings which have good chemical and water resistance while showing satisfactory heat and weather stability.

THE POLYOL

The resinous polyols used in the preparation of the new compositions of the invention comprise the copolymers of ethylenically unsaturated monohydric alcohols and alkenyl-substituted aromatic compounds, and preferably those containing from 15% to 90% by weight of combined alkenyl-substituted aromatic compounds. The ethylenically unsaturated monohydric alcohols include, among others, allyl alcohol, chloroallyl alcohol, methallyl alcohol, beta-phenylallyl alcohol, and the like. Particularly preferred are the 2-alkenols containing from 3 to 8 carbon atoms.

The alkenyl-substituted aromatic compounds used in preparing the resinous copolymers include, among others, styrene, p-chlorostyrene, alpha-methylstyrene, p-methoxystyrene, p-butylstyrene, p-octylstyrene, vinyl toluene, 2,5-dibutylstyrene, beta-vinyl naphthalene, 2,4-dichlorostyrene and the like. Particularly preferred are styrene, and the nuclear chloro- and alkyl substituted styrene wherein the alkyl groups contain from 1 to 4 carbon atoms.

The resinous polyols are preferably prepared by heating a mixture of the unsaturated alcohol and the alkenyl-substituted aromatic compound at a temperature ranging from about 100° C. to about 250° C. in the presence of from about .1% to about 25% of a peroxide having a decomposition temperature in excess of 90° C., the quantity of the peroxide being based on the weight of the monomers.

The preferred procedure is to add the alkenyl-substituted aromatic compound in small increments during the course of the reaction. The addition is regulated so as to maintain the ratio of unreacted monomers substantially constant and thus permit the formation of a copolymer having uniform composition.

The ratio in which the alcohol and the alkenyl-substituted aromatic compounds may be combined at the beginning of the reaction, and preferably maintained during the course of the reaction, may vary within wide limits. As the monomers differ in the rate of polymerization, the ratio of unreacted monomers will differ from the ratio in which the monomers appear in the copolymer and it will be necessary to run a few preliminary determinations to establish the ratio of unreacted monomers needed to give a copolymer of the desired composition. If allyl alcohol and styrene are the monomers and the catalyst is di-tert-butyl peroxide at a temperature of about 120° C., the relation of the ratio of unreacted monomers to finished copolymer composition may be illustrated by the following:

| Allyl alcohol-Styrene, Moles Unreacted monomer in Polymerization Mixture | Peroxide, Percent w. of Copolymer | Vinyl Aromatic, Percent w. in Copolymer |
|---|---|---|
| 10:1 | 3.5 | 82 |
| 20:1 | 7.2 | 69 |
| 30:1 | 9.9 | 60 |
| 900:1 | 23.7 | 13 |

The peroxides employed in the polymerization are preferably those that are stable at temperatures above 90° C. Such peroxides include di-tertiary-butyl peroxide, hydrogen peroxide, tertiary-butyl hydroperoxide, cumene hydroperoxide, paramenthane hydroperoxide, tertiary-butyl perbenzoate and the like.

As noted, the peroxide is preferably utilized in an amount varying from .1% to 25% by weight of monomer, and preferably .1% to 10%. The exact amount used will depend on a number of considerations. One important consideration is the proportion of the unsaturated alcohol present as the polymerization proceeds—i.e. with higher concentrations of the alcohol greater amounts of peroxide are required. This in turn is related to the desired composition of the copolymer as described above. Another important consideration is the temperature at which the copolymerization is conducted. As a generalization, it may be stated that at higher temperatures, e.g., in the order of 160–180° C., the quantity of the peroxide required is lower, at lower temperatures i.e., in the order of 120–130° C., the quantity of the peroxide required is greater.

The temperature employed will vary depending upon factors such as desired reaction time, amount of peroxide and the molecular weight of the finished copolymer. In most cases, the temperatures employed will vary from about 100° C. to about 250° C. Temperatures within this range give satisfactory reaction rates, can be used with economical amounts of peroxide catalyst and give products having molecular weights within the desired range, e.g. from about 500 to about 8,000 and preferably between 700 and 3,000. The molecular weights are determined ebullioscopically in dichloroethane.

After the copolymerization is complete, the reaction product may be worked up in any conventional manner to recover the copolymer and remove any unreacted monomer and byproducts. The separation may be accomplished by any means, such as, for example, distillation, extraction and the like.

The preparation of an allyl alcohol-styrene copolymer by the above method is shown below:

*Copolymer A.*—To a pressure vessel equipped with an agitator, thermometer and suitable fixture for pumping liquids into the vessel under pressure, are charged 11,085 parts (191 moles) of allyl alcohol, 994 parts (9.6 moles) of styrene, stabilized with .005% of tertiary-butyl catechol, and 241.6 parts of ditertiary butyl peroxide. The temperature is raised to 135° C. and maintained at about this temperature for 5 hours. Over the five hour period additional styrene is pumped into the reaction vessel so that at the end of the first hour about an additional 700 parts of styrene is added; at the end of the second hour about 490 parts; at the end of the third hour about 344 parts; at the end of the fourth hour about 242 parts; and at the end of the fifth hour about 169 parts. This styrene likewise contains tertiary-butyl catechol stabilizer. After the reaction is complete, the contents of the vessel are distilled to separate the unreacted monomers. The residue, at 23% conversion, is a brittle resin which is substantially colorless. It has a styrene content of about 70%, hydroxyl equivalent of .45/100 g., a molecular weight of about 1300, a softening point (Durrans) of 95° C. and an acidity of less than 0.001 eq./100 g.

*Copolymer B.*—The above process is repeated with the exception that the mole ratio of allyl alcohol to styrene is changed to about fifty to one. The resulting product is a brittle resin having a styrene content of about 40%, and a hydroxyl content of 0.750 eq./100 g.

*Copolymer C.*—The above process is repeated with the exception that the mole ratio of allyl alcohol to styrene is changed to about 10 to 1. The resulting product is a brittle resin having a styrene content of 85% and a hydroxyl value of 0.271 eq./100 g.

*Copolymer D.*—To a reaction vessel equipped as above are charged 270 parts of allyl alcohol, 549 parts of paramethylstyrene and 8.2 parts of ditertiary butyl peroxide. The temperature is raised to 185° C. and maintained at this temperature for several hours while the mixture is blanketed with nitrogen. During the first, 3rd and fifth hours, respectively, 8.2 parts of ditertiary-butyl peroxide is added. When the reaction is complete the contents of the vessel are distilled at 155° C. at about 1 mm. Hg. The copolymer is a brittle resin having a mole weight of 470, a hydroxyl value of about 0.36 eq./100 g. and an acidity of less than 0.001 eq./100 g.

*Copolymer E.*—A para-chlorostyrene-allyl alcohol copolymer is prepared using the same weight relationship as in the preceding example. The product is a clear, brittle solid having a high hydroxyl value.

THE ALKYLENE OXIDE ADDUCT

From the polyols prepared as indicated above the alkylene oxide adducts thereof are prepared. Any alpha, beta-alkylene oxide may be employed with the species of ethylene oxide and propylene oxide being particularly preferred. Other alpha, beta-alkylene oxides having up to 10 carbon atoms may be used but it will be found that the water resistance of the ultimate products are less satisfactory.

The adduct is simply prepared by reacting a polyol of the type described, as copolymer A through E above, with the alkylene oxide at elevated temperatures. Reaction temperature may range from about 30° C. to about 90° C. with temperatures in the order of 45–60° being preferred. The addition of the alkylene oxide to the polyol is best accomplished with the polyol in solution. For this purpose any inert diluent or common solvent may be employed such as chloroform, methyl isobutyl ketone, xylene, or the like. It will be found to be advantageous also to employ in the solvent a small amount, that is, in the order of 5% or more, of a lower alcohol such as ethanol, butanol, or the like. Thereafter the alkylene oxide is added, as such, to the reactor or contained in solution with an organic diluent therefor. In the case of propylene oxide or the higher alpha, beta-alkylene oxides, it is equally suitable to merely add the alkylene oxide as such. In the case of ethylene oxide, which is normally a gas, greater ease of handling is accomplished if it is dissolved in an inert solvent.

The quantity of the alkylene oxide which is employed may be varied widely depending upon the active hydroxy groups in the polyol and the extent to which it is desired to replace the hydroxy groups by addition of the alkylene oxide. In general, the alkylene oxide may range from about 20 to about 80 weight percent based on the polyol. In the more preferred embodiment the alkylene oxide is added in an amount to yield an adduct containing about 30 to about 40 weight percent of alkylene oxide. Such a range ultimately produces a more suitable product by reasons of hardness, flexibilty, chemical and water resistance, and the like. After the reactor is charged with the polyol and the alkylene oxide together with the solvents, a catalyst is added in order to hasten the formation of the adduct. Catalysts which are used for this purpose include the acid or acid engendering catalysts such as phosphoric, hydrochloric, maleic, oxalic acids, butyl hydrogen phosphate, ethyl hydrogen phosphate, cresyl hydrogen phosphate, butyl titanate, 2-ethyl hexyl titanate, p-toluenesulfonic acid, benzenedisulfonic acid, and the like. Other suitable catalysts include materials which are acidic at elevated temperatures such as ammonia or amine salts of sulfuric or sulfonic acids, e.g., ammonium salts of p-toluene sulfonic acid, p- and/or o-phenol sulfonic acid, the urea salt of ortho and/or para phenol acid, the urea salt of ortho and/or para phenol sulfonic acid, of p-toluene sulfonic acids; the mono urea, morpholine and ethanol amine salts of sulfuric acid and the like. Other catalysts may also be employed, such as the boron trifluoride complexes, such as the amine, ether, phenol and ester complexes, metal salts, such as tin naphthenate, acid anhydrides, acid chlorides and the like.

Various amounts of the catalyst may be used, but the amount preferably varies from 0.2% to 5% by weight. The acids are particularly effective when added in amounts varying from about 0.5% to 2% by weight.

The preparation of the adduct is illustrated by the following examples.

*Adduct A.*—To a three-neck reactor equipped with an agitator and a Claisen adapter is charged 100 grams of a styrene-allyl alcohol copolymer prepared as indicated under copolymer A above, and 300 grams of chloroform. The polyol is dissolved in the chloroform and the mixture is gently heated to about 50° C. after which 50 cc's. of chloroform are taken off to free the system of water. Thereafter the solution is cooled and 1 cc. of boron trifluoride-ether complex is added and the Claisen adapter is replaced with a dropping funnel containing 290 grams of redistilled propylene oxide. With constant agitation the mixture is heated at about 50° for 1 hour and 15 minutes while the propylene oxide is continually added to the reactor. Thereafter the contents of the reactor are cooled to about 35° C. and an additional 1 cc. of the ether complex is added. The temperature is then raised to about 50° C. and the reaction is continued for an additional 45 minutes. Thereafter the mixture is subjected to distillation whereupon about 190 cc's. of volatiles are removed. About 10 cc's. of water are then added to destroy the catalyst after which the mixture is stabilized at 153° C. and 2 mm. Hg. to yield 247 grams of a light yellow residue which is clear and viscous. The propylene oxide adduct has a hydroxyl value of .2, an acidity of .001 eq./100 g., molecular weight of about 1317, a carbon content of 69.0% by weight and a hydrogen content of about 9.8% which calculates to a propylene oxide content in the adduct about 63.5%.

*Adduct B.*—The above procedures are repeated except that a total of 58 grams of propylene oxide are added drop-wise at temperatures in the order of about 30° C. over a period of about 35 minutes. Thereafter the solution is allowed to stand while being agitated for about 60 minutes. It is observed that the temperature rises to 50° C. The solution is then cooled and .5 cc. of the etherate is added. The temperature is then raised to about 55° C. and permitted to remain at that temperature for an additional 40 minutes. The stabilization is conducted at 154° C. and 2.8 mm. There is obtained 141 grams of the propylene oxide adduct which is clear amber in color and is a viscous liquid. It has a hydroxyl value of .39, an acidity of .001 eq./100 g. and a molecular weight of about 3000 determined ebullioscopically in methyl ketone.

*Adduct C.*—In a similar manner, a solution of 200 grams of the polyol prepared as indicated above is dissolved in 600 grams of chloroform. Any water in the system is removed by distilling off 200 grams of chloroform. Two grams of boron fluoride etherate is added and the solution is warmed to about 50° C. 160 grams of propylene oxide is added over a 50 minute period while keeping the temperature at about 50–60° C. After the propylene oxide is added the reaction mixture is heated to 60° C. for one hour. An analysis of a withdrawn sample indicates a significant amount of propylene oxide remains unreacted. Accordingly, the reaction is continued for an additional 30 minutes. The final product, after removing the volatiles at 150° C. and 2 mm. Hg. is clear, viscous, amber liquid having the following analysis: percent C=74.2, percent H=9.3, acidity less than .001 eq./100 g, hydroxyl .24 eq./100 g. and molecular weight about 1425.

*Adduct D.*—In a manner similar to that indicated above, 174 grams of a styrene-allyl alcohol copolymer is dissolved in 450 grams of chloroform. The solution is dried by azeotroping the water. Thereafter, 1 gram of boron fluoride etherate is added and the solution is heated to 50° C. 133 grams of propylene oxide are then added dropwise over a period of about 60 minutes with cooling being applied to maintain the temperature at 55–60° C. After the addition of the propylene oxide is complete the solution is heated an additional hour at 60° C. followed by a heat treatment at 68° C. for 30 minutes. Thereafter, 10 mls. of water are added with vigorous agitation for 15 minutes at 50° C. The mixture is then fractionated and the fraction recovered at 140° C. at 2.5 mm. Hg., which amounts to about 127 grams, is a clear, yellow solid having a molecular weight of about 1450, hydroxyl value of 0.25, an acidity of less than .001 eq./100 g., a carbon content of 75.5% and a hydrogen content of 9.2%, by weight. The calculated propylene oxide content in the polymer amounts to about 37%.

*Adduct E.*—Following the above procedures, 200 grams of a polyol prepared as indicated above is dissolved in 400 cc's. of chloroform. Two grams of the boron fluoride etherate is added. Gaseous ethylene oxide is fed through the reactor at about 30–40° C. while the solution is heated to and maintained at about 50–55° C. The ethylene oxide is added over a period of 90 minutes after which heat is applied at about 60° C. for an additional 60 minutes. Thereafter 10 grams of calcium hydroxide and 10 cc's. of water are added and stirred into the mixture. The reaction product is then filtered, stabliized at 150° C. and 2 mm. Hg. to produce 300 grams of a viscous, amber colored resin having the following analysis: hydroxyl value .259 eq./100 g., acidity .001 eq./100 g., molecular weight about 1788, carbon content about 71.7% and a hydrogen content of about 8.7%, by weight. Based on an estimated addition of 190 grams of ethylene oxide the adduct contains about 35.7% of the oxide in the adduct.

From the foregoing illustrations of the preparation of the adduct it will be apparent that the preparation of the adduct is capable of numerous modifications in processing techniques such as variations in the quantity of catalysts, reaction times, temperature, working-up procedures and the like. Such modifications will, in all cases, result in variations of the molecular weight, acidity, hydroxyl value and the like.

THE ADDUCT-AMINOPLAST PRODUCT

From the alkylene oxide-polyol adduct prepared as indicated above, the products of this invention are produced by reaction of the adduct with an aminoplast. As used in this description the term "aminoplast" refers particularly to any of the large number of amino resins which are commonly employed in the art in surface coating applications. They are characterized as being soluble in common solvents as distinguished from amino resins of the thermosetting type which are employed in molding or casting compositions. Typical among the aminoplasts which are suitable for the purpose of this invention there may be mentioned the aldehyde resins formed with melamine, urea, guanamine, ammeline, ammelide, cyanuric acid, biuret, dicyandiamide, and the like. In the most preferred embodiment the aldehyde is formaldehyde although it will be appreciated that other aldehydes may also be employed in the preparation of the aminoplast. Other aldehydes include paraform aldehyde, acetaldehyde, propionaldehyde, and the like. In general, however, it is preferred that formaldehyde or paraformaldehyde be employed as such aminoplast are found to be more suitable for the present invention. In actual practice, the urea and/or melamine aminoplasts are preferred because they are less expensive and more readily available through normal commercial channels although the ammeline, ammelide, cyanuric acid, guanamine and dicyandiamide aminoplasts are also highly suitable.

In general, the products of this invention are prepared by dissolving the alkylene oxide adduct and the aminoplast in a common solvent such as xylene, which may or may not contain a small amount of a lower alcohol such as butanol. If the solvent is mixed with an alcohol as butanol the alcohol may be present in amounts ranging from about 2 to 10% with about 5%, by weight, being more preferred. After the adduct is in solution an aminoplast of the type described is mixed with the adduct. Alternatively, the aminoplast may be placed in solution and the thus prepared solution is added to the adduct solution. The quantity of the aminoplast which is employed may range from about 10 to about 65 parts by weight per hundred parts of the adduct. More conveniently, however, it is advantageous to base the quantity of the aminoplast on the hydroxyl value of the adduct. Thereafter, a small amount of an acid catalyst may be added such as paratoluene sulfonic acid morpholine salt, phthalic anhydride or any other commonly employed acid catalyst of the type described above. The mixture thus prepared may be applied as a film by spraying, dipping, rolling, or the like followed by baking at elevated temperatures wereby the solvents are evaporated.

Baking temperatures range from about 225° to about 325° F. with about 265° to about 300° F. being suitable in most cases. The baking time will vary depending upon the baking temperature and the nature of the particular composition being applied as a coating.

In a more preferred embodiment of the present invention, and as applied more commonly in actual practice, the products of this invention also contain pigments to impart color to the products. A common pigment for this purpose is titanium dioxide which imparts a white finish to the film. The pigments, the amount of which vary depending upon its coloring properties, are added by blending the pigment while the adduct and aminoplast are mixed in solution. The blending may be accomplished in any suitable manner as by rolling in ball mill for several hours or blending on a three-roll paint mill. Thereafter the composition is applied to the surface as indicated above.

The preparation of the novel products of this invention are described below.

Example I

In two separate experiments, the ethylene oxide adduct "E" above, is dissolved in a 6:1 weight ratio of xylene and butanol to give a solution containing 66% solids. Thereafter, a solution of the melamine-formaldehyde resin in the same diluent, identified as Cymac 245-8, a product of the American Cyanamid Company, is added. The quantity of the Cymac 245-8 is 10 and 20%, respectively, based on the weight of the propylene oxide adduct. To each mixture is added 1% by weight, based on the solids, of para-toluene sulfonic acid morpholine salt. The mixtures are thoroughly agitated for several minutes and applied as films by dipping on a smooth surface. The films are then baked for 30 minutes at 150° C. and the properties of the film are indicated in Table I.

Example II

The propylene oxide adduct of the polylol described as adduct "C," above, is mixed with Cymac 245-8 in a similar manner, as indicated in Example I. The properties of the film after curing in an identical fashion is indicated also in Table I.

TABLE I

|  | Ethylene Oxide Example I | Propylene Oxide Example II |
| --- | --- | --- |
| Wt. Percent Oxide in Adduct | 35.7 | 37 |
| Percent Aminoplast | 20 \| 30 | 20 \| 30 |
| Sward Hardness | ca. 20-25 \| 35 | 18 \| 29 |
| Mar Resistance | good | good |
| Xylene 15' | ¹ NE \| NE | NE \| NE |
| 86 Hr. H₂O—room temp | few blisters | tiny blisters |

¹ NE means "no effect."

It will be seen that the products of this invention exhibit suitable mar resistance, hardness and excellent resistance in common solvents. In a similar fashion compositions prepared with ureaformaldehyde aminoplasts, such as those having the trade names of Uformite, Beetle, Cymac and Beckamine and other similar types of aminoplasts will produce suitable surface coatings as indicated in the above examples. Among the other suitable aminoplasts there may be mentioned the ammeline-formaldehyde, guanamine-formaldehyde and biuret-formaldehyde aminoplasts.

Example III

Compositions similar to those in Examples I and II are prepared except that titanium dioxide is added in an amount in the order of about one part by weight per part of the total resin solids. The mixture is thoroughly blended in a ball mill for 24 hours. The compositions thus prepared are applied as films by dipping and baking for 30 minutes at 150° C. The results are indicated in Table II.

TABLE II

|  | Ethylene Oxide | Propylene Oxide |
| --- | --- | --- |
| Percent Oxide | 35.7 | 37 |
| Percent Aminoplast | 20 \| 30 | 20 \| 30 |
| Gloss | 77 \| 67 | 77 \| 65 |
| Sward Hardness | 23 \| 26 | 21 \| 21 |
| Mar Resistance | excellent | excellent |
| 15' Xylene | NE \| NE | soft \| NE |
| 24 Hr. H₂O | tiny blisters | tiny blisters |

From the foregoing it will be seen that the present invention is capable of numerous modifications which modifications are within the spirit of the present invention.

We claim as our invention:

1. A resinous composition comprising the reaction product of (1) an alpha, beta-alkylene oxide adduct of a polyol, the polyol consisting of a copolymer of an ethylenically unsaturated monohydric alcohol and an alkenyl substituted aromatic compound and (2) a resinous aminoplast.

2. The composition of claim 1 in which the monohydric alcohol is allyl alcohol.

3. The composition of claim 1 in which the alkenyl substituted aromatic compound is styrene.

4. The composition of claim 1 in which the alkenyl substituted aromatic compound is para-methyl styrene.

5. The composition of claim 1 in which the alkylene oxide is ethylene oxide.

6. The composition of claim 1 in which the alkylene oxide is propylene oxide.

7. The composition of claim 1 in which the aminoplast is a melamine-formaldehyde resin.

8. The composition of claim 1 in which the aminoplast is a urea-formaldehyde resin.

9. The process for preparing a resinous composition of (1) an alpha, beta-alkylene oxide adduct of a polyol, the polyol consisting of a copolymer of an ethylenically unsaturated monohydric alcohol and an alkenyl substituted aromatic compound and (2) a resinous aminoplast which comprises reacting the said polyol with an alpha, beta-alkylene oxide at a temperature from about 30° C. to about 90° C., thereafter reacting the thus formed adduct with a resinous aminoplast at a temperature from about 225° F. to about 325° F. in the presence of an acid catalyst.

10. The process of claim 9 in which the monohydric alcohol is allyl alcohol.

11. The process of claim 9 in which the alkenyl substituted aromatic compound is styrene.

12. The process of claim 9 in which the alkenyl substituted aromatic compound is para-methyl styrene.

13. The process of claim 9 in which the alkylene oxide is ethylene oxide.

14. The process of claim 9 in which the alkylene oxide is propylene oxide.

15. The process of claim 9 in which the aminoplast is a melamine-formaldehyde resin.

16. The process of claim 9 in which the aminoplast is a urea-formaldehyde resin.

17. A resinous composition comprising (1) an alpha, beta-alkylene oxide adduct of a polyol, the polyol consisting of a copolymer of a 2-alkenol containing from 3 to 8 carbon atoms and a member of the class consisting of styrene, nuclear chloro-substituted styrene, and nuclear alkyl-substituted styrene wherein the alkyl groups contain from 1 to 4 carbon atoms, and (2) a resinous aminoplast which is the reaction product of formaldehyde and a member of the class consisting of urea and melamine.

18. The process for preparing a resinous composition of (1) an alpha, beta-alkylene oxide adduct of a polyol, the polyol consisting of a copolymer of a 2-alkenol containing from 3 to 8 carbon atoms and a member of the class consisting of styrene, nuclear chloro-substituted styrene, and nuclear alkyl-substituted styrene wherein the alkyl groups contain from 1 to 4 carbon atoms, and (2) a resinous aminoplast, which comprises reacting the said polyol with an alpha beta-alkylene oxide at a temperature from about 30 to about 90° C., and thereafter mixing the thus formed adduct with the resinous aminoplast.

19. The process of claim 18 in which the mixture is heated to a temperature of from about 225 to 325° F. in the presence of an acid catalyst to form a baked-enamel type of coating.

References Cited in the file of this patent

UNITED STATES PATENTS

| | | |
|---|---|---|
| 2,470,757 | Bobalek | May 24, 1949 |
| 2,588,890 | Shokal | Mar. 11, 1952 |
| 2,624,722 | Kropa | Jan. 6, 1953 |

FOREIGN PATENTS

| | | |
|---|---|---|
| 527,417 | Belgium | Sept. 20, 1954 |
| 923,503 | Germany | Feb. 14, 1955 |